United States Patent
North

(10) Patent No.: US 7,416,362 B2
(45) Date of Patent: Aug. 26, 2008

(54) MULTIDIRECTIONALLY COMPLIANT FASTENING SYSTEM

(75) Inventor: David D. North, Palm Beach Gardens, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 0 days.

(21) Appl. No.: 10/222,279

(22) Filed: Aug. 16, 2002

(65) Prior Publication Data

US 2004/0033105 A1    Feb. 19, 2004

(51) Int. Cl.
*F16F 1/00* (2006.01)
*C04B 37/02* (2006.01)

(52) U.S. Cl. .................. 403/30; 403/166; 267/150; 267/161

(58) Field of Classification Search ............. 403/28–30, 403/166, 179, 157, 220, 221, 272, 223, 224–229, 403/238, 243, 260, 365, 369, 371, 408.1, 403/111, 145–149, 203; 411/531, 544, 156; 60/796; 267/150 X, 161 X, 162, 161, 150
See application file for complete search history.

(56) References Cited

U.S. PATENT DOCUMENTS

| | | | |
|---|---|---|---|
| 1,475,344 A * | 11/1923 | Judson | 74/490 |
| 2,883,012 A | 4/1959 | Hoffman | |
| 3,541,220 A * | 11/1970 | Kikuchi et al. | 174/12 BH |
| 3,835,615 A | 9/1974 | King, Jr. | |
| 4,281,941 A | 8/1981 | Rottenkolber | |
| 4,787,793 A | 11/1988 | Harris | |
| 4,834,569 A | 5/1989 | Foote et al. | |
| 4,889,458 A | 12/1989 | Taylor | |
| 4,975,014 A | 12/1990 | Rufin et al. | |
| 5,020,932 A | 6/1991 | Boyd | |
| 5,116,158 A | 5/1992 | Carruthers et al. | |
| 5,228,795 A | 7/1993 | Gray | |
| 5,320,443 A | 6/1994 | Lien et al. | |
| 5,525,001 A | 6/1996 | Perkins | |
| 5,592,814 A | 1/1997 | Palusis et al. | |
| 5,662,444 A | 9/1997 | Schmidt, Jr. | |
| 5,746,561 A | 5/1998 | Nygren, Jr. et al. | |
| 5,807,052 A | 9/1998 | Van Boven et al. | |
| 5,848,874 A | 12/1998 | Heumann et al. | |
| 5,888,012 A | 3/1999 | Nygren, Jr. et al. | |
| 6,102,610 A | 8/2000 | Palusis et al. | |
| 6,215,445 B1 | 4/2001 | Chang | |

* cited by examiner

*Primary Examiner*—Victor MacArthur

(57) ABSTRACT

A fastening system has at least one peripheral spring and at least one peripherally expandable bushing, with the peripheral spring being at least partially enclosed within the peripherally expandable bushing. The peripheral spring and peripherally expandable bushing each contain axial openings for receiving an elongated fastening member to secure two dissimilar structures together. The peripheral spring can be a spring bushing. The spring bushing can comprise a series of radially outwardly bowed ribs joined at one end by a fixed hoop. The axial spring can be a spring washer. The peripherally expandable bushing can be a split bushing.

19 Claims, 2 Drawing Sheets

MULTIDIRECTIONALLY COMPLIANT FASTENING SYSTEM

CROSS REFERENCE TO RELATED APPLICATIONS (Not Applicable)

STATEMENT REGARDING FEDERALLY SPONSORED RESEARCH (Not Applicable)

FIELD OF THE INVENTION

The present invention relates in general to fastening systems and, more particularly, to fastening systems for joining dissimilar materials.

BACKGROUND OF THE INVENTION

Gas turbines typically produce high temperatures and heavy vibrations during operation, and these conditions can be damaging to many materials used in the construction of the turbines. Consequently, the types of materials that can be used is quite limited. For example, suitable materials must have high-strength and low-weight characteristics while at the same time be able to withstand high temperatures. Engineers have considered certain metal alloys, composites and ceramics among the materials to be used in such an environment.

Ceramics have been considered because of their comparatively light weight and high melting points. Unfortunately, ceramics can be relatively brittle, especially when used as structural components. Despite this shortcoming, design considerations may nevertheless dictate the incorporation of ceramics in certain structural applications, such as in the construction of fan or turbine blade assemblies in a turbine engine.

When fastening ceramic materials to other structures, great care must be taken because these ceramic materials may be intolerant to local stresses introduced by a fastener. These stresses can arise, for example, from fixed displacement of the fastener due to the vibrational forces generated from the operation of the turbine.

Thermal stresses may also be present when ceramics interface with fasteners or other structures made of dissimilar materials, especially those having different coefficients of thermal expansion. In comparison to metals, ceramics have a relatively low coefficient of thermal expansion. Thus, when a metal fastener, such as a metal bolt, disposed in an opening of a ceramic structure is heated, the bolt will expand radially more than the surrounding ceramic. Eventually, the metal fastener may come into contact with the surrounding ceramic, applying potentially cracking forces.

Therefore, there is a continuing need for a system for fastening dissimilar materials, such as metals and ceramics, that is capable of distributing vibrationally and thermally induced loads while avoiding local high strain conditions. Moreover, there is a need for such a fastening system that permits easy removal when necessary.

SUMMARY OF THE INVENTION

In one aspect, the present invention is directed to a fastening system that provides multi-directional compliance between a first structure and a second structure. The first structure has at least one opening and the second structure has at least one opening for permitting the insertion of an elongated fastener along an axis. At least one axial spring is operatively positioned between the first and second structures for providing resilient compliance between the first and second structures along the axis. At least one peripheral spring is provided for resilient compliance between the first and second structures transversely to the axis. The peripheral spring is disposed at least partially within the opening in the second structure.

In another aspect of the present invention, a fastening system includes at least one peripheral spring and at least one peripherally expandable bushing. The peripheral spring and peripherally expandable bushing each contain axial openings for receiving an elongated fastening member to secure two dissimilar structures together.

In still another aspect, a multi-directionally compliant fastening system is used to join a ceramic structure having an opening and a clevis having a set of opposing openings. The opening in the ceramic structure is positioned between and in alignment with the set of opposing openings in the clevis. The aligned openings receive at least a portion of a fastener assembly. The fastener assembly includes a bolt, a nut, flat washers, spring washers, a split bushing and a spring bushing. The spring bushing is at least partially enclosed within the split bushing. The split bushing and spring bushing are at least partially disposed within the opening in the ceramic structure. The spring washers are positioned between the aligning openings of the clevis and the ceramic structure. The bolt extends axially through the aligning openings of the clevis and ceramic structure. The bolt has opposing ends with a head at one end and the nut is secured to the other end of the bolt. A flat washer is disposed between the head of the bolt and the clevis and also between the nut and the clevis.

DETAILED DESCRIPTION OF EMBODIMENTS OF THE INVENTION

The fastening system of the present invention provides axial and radial compliance and is preferably used for joining two dissimilar materials, particularly those materials having substantially different coefficients of thermal expansion. The fastening system can be used in a variety of applications, where vibrational absorption is required along multiple axes of contact between two joined structures. For example, the fastening system of the invention can be used when one of the structures is relatively brittle and subject to cracking if subject to the vibrational loads of the other structure to which it is joined. Such constructions can occur in gas turbines, furnaces and coal burners, in which ceramic materials are used for their high temperature toleration and are supported by metal structures in vibrational environments. Also, aspects of the present invention address differences in thermal expansion which can result in fracturing forces upon the ceramic or other brittle structure. Embodiments of the invention will be explained in the context of joining a ceramic T-member to a metal clevis, such as those present in a turbine vane assembly. However, the illustrations and detailed description are intended only as exemplary. One embodiment of the invention is shown in FIGS. 1-4, but the present invention is not limited to the shown structure.

Figure 1:
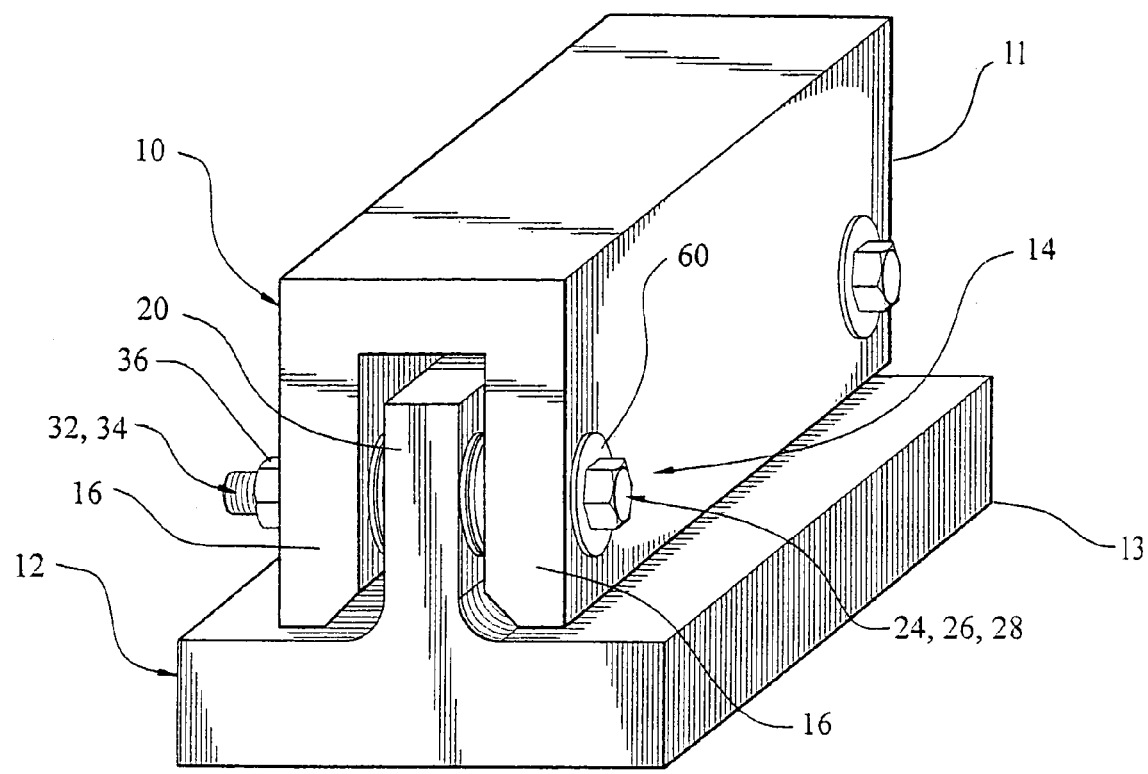
FIG. 1 is a perspective view of one embodiment of the fastener system of the present invention wherein a clevis is attached to a generally t-shaped structure.

Referring to FIG. 1, an embodiment of the invention is shown that can include a first structure 10 and a second structure 12 joined by a fastening system 14. The exemplary first structure 10 can provide extensions or flanges 16, each equipped with an opening 18 (See FIG. 3) for receiving an elongated fastening member of the assembly 14. As shown in FIG. 1, the first structure 10 preferably has two substantially parallel flanges 16 that can accommodate another part in between. The first structure 10 can be, for example, a clevis, or it may be any structure that otherwise has a generally u-shaped cross-section either in its entirety or at least in a localized area. The first structure 10 may be any material, but metals are preferred, especially those that can withstand high-temperature environments, such as experienced in a gas turbine. Whatever the material selection, the first structure 10 will have an associated coefficient of thermal expansion.

In one embodiment, the second structure 12 has a generally t-shaped cross section; however, the cross-sectional profile is not limited to any exact configuration. The second structure 12 may take on any shape as long as at least a portion, such as an extension 20, of the second structure 12 is able to interface with the flanges 16 of the first structure 10. The second structure 12 is provided with at least one through opening 22 (See FIG. 3), but additional openings may be provided depending in part on the overall length of the first and second structures 10, 12. Preferably, the opening 22 in the second structure 12 is suitable for alignment with the opposing set of openings 18 in the first structure 10, but alignment is not necessary.

Like the first structure 10, the second structure 12 may be made of any material, but preferably it is a material that can withstand high temperature environments such as in a gas turbine. Accordingly, the second structure 12 may be metal, composite or, most preferably, ceramic. The material selected will have an associated coefficient of thermal expansion. The present invention is particularly suited for protecting against thermal loads that arise when the first and second structures 10, 12 have different coefficients of thermal expansion.

In the context of a turbomachinery application, the first structure 10 may be a part of a turbine vane platform 11 while the second structure 12 may be a turbine vane flange 13. Other applications are possible in which materials with different coefficients of expansion or different vibrational tolerances are joined.

Figure 2:
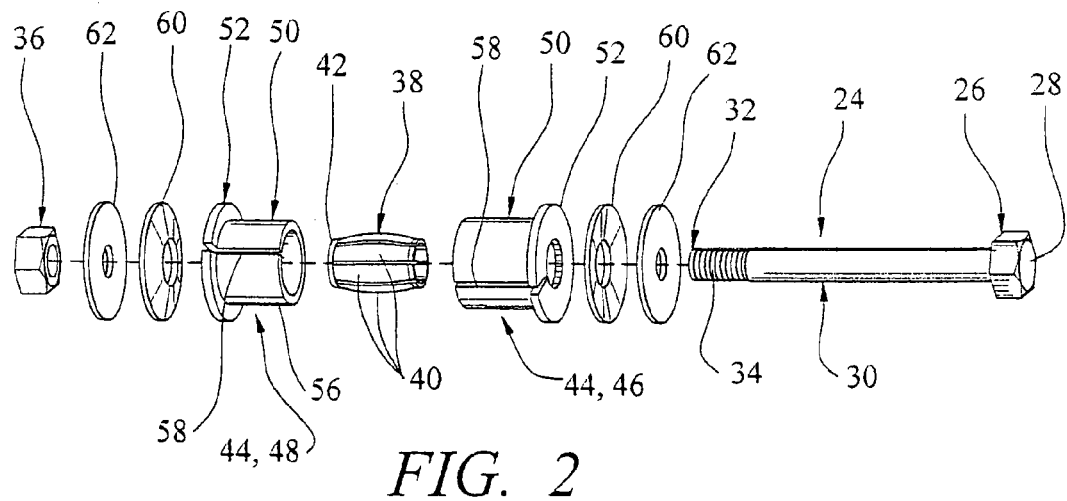
FIG. 2 is an exploded view of the fastener system used in the embodiment depicted in FIG. 1.

The fastening system 14 according to aspects of the present invention is received at least partially within the aligned holes 18, 22 of the first and second structures 10, 12. FIG. 2 illustrates one embodiment of a fastener system, which includes, among other things, an elongated member, axial springs, a radially expandable bushing, a peripheral spring, and a retainer. These components cooperate to counteract and distribute impinging forces to protect both structures, especially the second structure 12. Each component of the fastening system will be examined in turn.

One member of the fastener system is an elongated member that passes through the first and second structures 10, 12 as well at least some of the other components of the fastening system 14. The elongated member is the main component for holding the other components of the system together. Preferably, the elongated member is a bolt 24 having a head 26 at a proximal end 28 and a shank portion 30 that extends to a terminus at a distal end 32. The shank portion 30 may provide threads 34 along at least a portion of its length. Alternatives to the bolt 24 include permanent rivets or pins. While the alternatives can be permanent rivets or pins, the elongated member can be any component that generally provides the function of holding the fastening parts together.

Another component of the fastening system is a retainer for closing the fastening system and holding the two structures and fasteners together on the elongated member. In some circumstances, the retainer may also provide compression. In the embodiment in FIG. 2, the retainer is a hexagonal nut 36. The retainer is not limited to a hexagonal nut as the retainer may be another type of nut such as a wing or square nut. Additional examples of a retainer include cotter pins, welds, rivets or a screw-on cap. The foregoing examples are not intended as an exhaustive list of retainers as other structure may serve the intended function of retaining a series of components on an elongated member.

Another component of the fastening system embodied in FIG. 2 is a peripheral spring, or, in the case of a round member, a radial spring, for providing peripheral resilience against any motion of the elongated member in the direction of the periphery of the spring. In a preferred embodiment the peripheral spring is a spring bushing 38 for providing radial compliance. While a spring bushing may have various configurations and still provide radial resilience, the embodiment in FIG. 2 is directed to a generally barrel-shaped bushing comprising a series of outwardly bowed arc members 40 that are joined at one end by a fixed hoop structure 42. The amount of radial resilience is a function of at least the radial spring's axial length and radial thickness. An alternative structure may be a helical spring, and still other alternatives will work so long as they function to provide a radial resilience to radial displacement of the elongated member.

The radial spring member may act in cooperation with a radially expandable member, which expands radially to accommodate radial movement of parts enclosed within the radial spring. The radially expandable member shields the through opening 22 (See FIG. 3) in the second structure 12 by providing a wear surface against which the radial spring can act. For example, when an elongated member passing through the radially expandable member grows in diameter due to thermal expansion, the radially expandable member can accommodate this radial growth by expanding radially along at least a portion of its circumference.

In a preferred embodiment, the radial member is a split bushing 44 comprising a first half 46 and a second half 48, each half comprising a generally cylindrical sleeve 50 with a generally circumferential flange 52 at one end. In the embodiment shown in FIG. 2, the inner diameter 54 of the sleeve portion 50 of the first half 46 is large enough to accommodate the outer diameter 56 of the sleeve portion 50 of the second half 48. Such relative dimensions allow the sleeve portion 50 of the second half 48 to slide at least partially into the sleeve portion 50 of the first half 46. Preferably, the entire sleeve portion 50 of the second half 48 extends axially into the sleeve portion 50 of the first half 46.

For this particular configuration of split bushing 44, each bushing half 46, 48 contains a continuous split 58 along an entire axial length, that is, through the sleeve 50 and flange portion 52. The splits 58 allow the bushing 44 to be spring loaded outward into the inner diameter in the opening 22 in the second structure 12 (See FIG. 3). The splits 58 may, however, extend less than the entire axial length of the bushing 44. Moreover, while each half 46, 48 of the split bushing 44 has a split 58, the splits 58 do not have to be aligned when the two halves 46, 48 are brought together. The radially expandable member can be any structure so long as it is radially expandable to accommodate the radial expansion of components at least partially enclosed inside of the radial expandable member.

The spring bushing 38 alone and in combination with the split bushing 44 provide for radial compliance for the fastening system, but these members do not necessarily ensure axial compliance. Thus, another component in the fastener system of the present invention can be axial springs for providing axial resilience to the system. Preferably, the axial spring is a spring washer 60, which is generally conically shaped tapering inward from the outer diameter to inner diameter. Alternatives to spring washers include helical springs or leaf spring-type washers; however, the axial spring need not be limited to these alternatives. Rather, any component may serve as the axial spring so long as the component supplies axial resiliency.

The final components in the fastener system embodied in FIG. 2 are flat washers 62. The flat washers 62 provide a bearing surface for the bolt 24 and nut 36 to distribute any localized stress caused by over tightening the bolt 24 or other operational conditions. The flat washers 62 distribute any load into the first structure 10. Alternatively, any component that provides a bearing surface to a bolt head or nut for distribution of stress will suffice.

Figure 3:
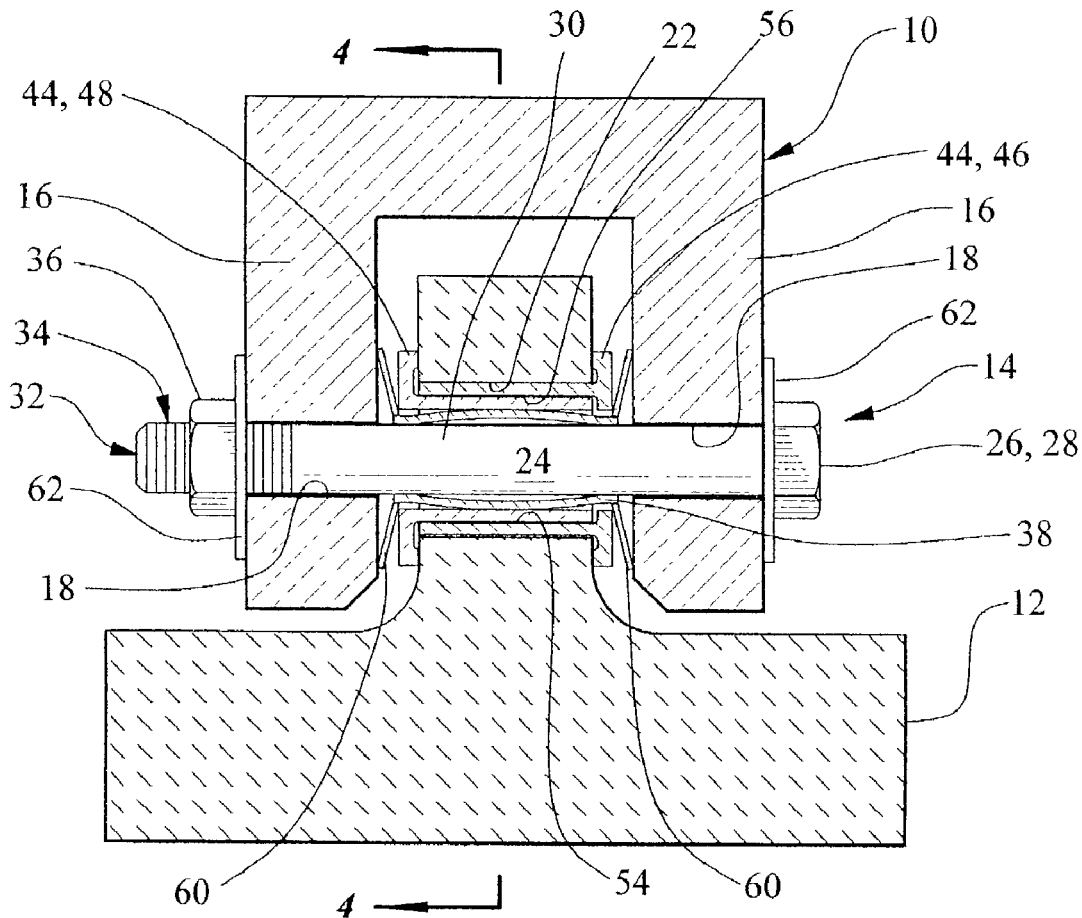
FIG. 3 is a sectional view through the fastener system depicted in FIG. 1.

With reference to FIGS. 2 and 3, a manner of assembling one embodiment of the fastener system will be described. First, the spring bushing 38 is inserted into the second half 48 of the split bushing 44. The spring bushing 38 and second half 48 of the split bushing 44 are then inserted into the opening 22 in the second structure 12 from one side (the left side in FIG. 3) until at least a portion of the circumferential flange 52 of the second half 48 of the split bushing 44 contacts an exterior surface of the second structure 12. Next, the first half 46 of the split bushing 44 is inserted into the opening 22 in the second structure 12 from the opposite side (the right side in FIG. 3). As previously noted, the sleeve portion 50 of the first half 46 of the split bushing 44 will slide over the sleeve portion 50 of the second half 48 of the split bushing 44. The first half 46 of the split bushing 44 is inserted until at least a portion of the circumferential flange 52 of the first half 46 of the split bushing 44 engages an exterior surface of the second structure 12.

Preferably, a portion of each hoop-like axial end of the spring bushing 38 extends outside of each respective axial end of the split bushing 44. These extending ends provide a place for positive engagement with the spring washers 60. In this way, the spring washers 60 may be held in place such that the openings in the spring washers 60 will be guaranteed to be substantially aligned with the axial holes in the spring bushing 38, providing an unimpeded path through which the bolt 24 is later inserted.

Next, the second structure 12, with spring bushing 38, split bushing 44 and spring washers 60 in place, is positioned inside of the two opposing faces 16 of the first structure 10 such that the opposing openings 18 in the first structure 10 align with the opening 22 in the second structure 12 as well as the openings in the spring washers 60, split bushing 44 and spring bushing 38. Next, a bolt 24 with a flat washer 62 placed upon the shank portion 30 is inserted through one of the openings 18 in the first structure 10 (the right opening in FIG. 3) and throughout the second structure 12 and attached fasteners and ultimately through the opposing opening 18 in the first structure 10. At this point, a length of the shank portion 30 of the bolt 24 should protrude outside of the other side of the first structure 10.

Finally, the fastening system 14 is closed so that the various components are held together. Accordingly, a nut 36 is threaded onto the protruding shank end 30 of the bolt 24 and tightened to the desired torque. Alternatively, a flat washer 62 is paced between the nut 36 and the side of the first structure 10.

Figure 4:
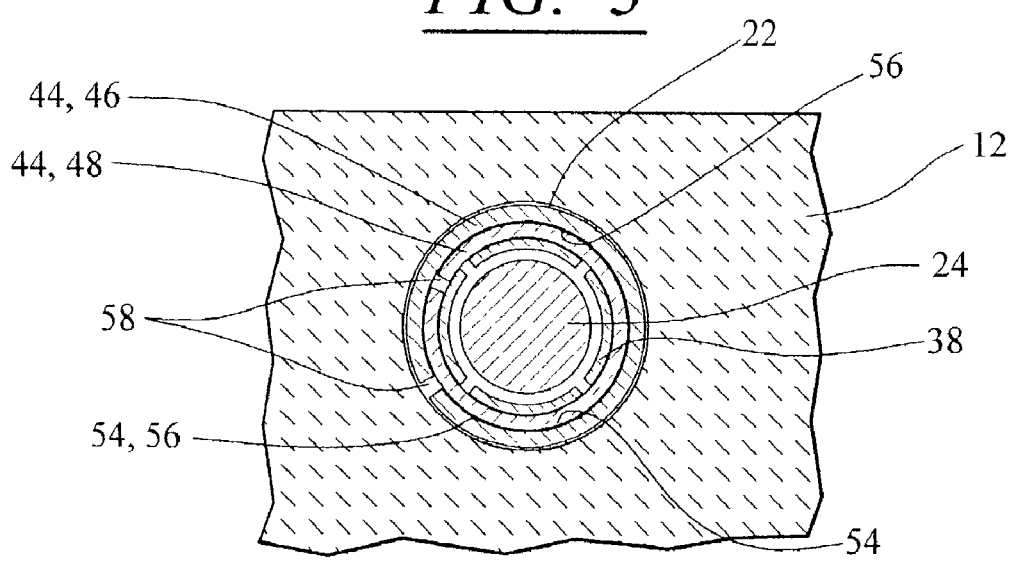
FIG. 4 is a sectional view through the fastener system, taken on line 4-4 in FIG. 3.

In operation, the above-described fastener provides multi-directional compliance to a variety of loads experienced in, for example, gas turbines. Vibration and shock cause a two-structure joint to experience axial, radial, and torsional loads. FIGS. 3 and 4 will be used to describe how the present fastener system mitigates such forces acting upon the system.

For example, when one end of bolt 24, for example, the head 26, is displaced upward, the distal end 32 of the bolt 24 will naturally move in the opposite direction. If the present system were not in place, then the bolt would impinge on the upper left and lower right sides of the opening 22 in the second structure 12. These points of contact would cause localized stress areas, which in turn may result in the cracking of the second structure 12, especially when the second structure 12 is a brittle ceramic material. Similarly, the bolt 24 may expand due to high temperatures and, without any buffer in place, the bolt 24 may eventually expand to impinge upon the brittle ceramic.

With the present fastening system 14 in place, however, the radial spring 38 is provided to resist radial displacement or expansion of the bolt 24 and to constantly urge the bolt 24 to return to its regular position. Moreover, the radial spring 38 will act on the bearing surface provided by the split bushing 44, which insulates the second structure 12 from contact with the bolt 24 or other components of the fastening system 14. In severe cases, where the amount of bolt expansion is large, the split bushing 44 will offer additional relief by, initially, the first half 46 of the spring bushing 44 expanding and, if necessary, the second half 48 of the spring bushing 44 expanding to accommodate bolt expansion.

If the system experiences an axial jolt, the present invention provides axial spring washers 60 to prevent the metal clevis structure 10 from impacting the ceramic structure 12. Not only do the spring washers 60 provide a buffer, but preferably they do not even act on the ceramic structure 12 as the bearing surfaces for the spring washers 60 include the metal clevis 10 and the circumferential flange 52 of each of the split bushing halves 46, 48. Because of the resiliency of the axial spring washers 60, the system will be urged back into its regular state.

If a torsional force is applied to the bolt 24, assuming a clockwise force applied to the system 14 shown in FIG. 4, the bolt 24 is allowed to rotate within the system 14. However, assuming a clockwise torsion applied to the system 14 as seen in FIG. 3, then the axial spring washers 60 would help the system 14 bear the load and distribute the torsional deflection.

It will of course be understood that the invention is not limited to the specific details described herein, which are given by way of example only, and that various modifications and alterations are possible within the scope of the invention as defined in the appended claims.

What is claimed is:

1. A fastening system comprising:
 a turbine engine component operatively connected to a turbine engine and having an opening;
 at least one peripheral spring having a series of longitudinally-bowed ribs;
 at least one bushing, wherein said peripheral spring is at least partially enclosed within said bushing, wherein said peripheral spring and said bushing are at least partially disposed within the opening in said turbine engine component, wherein said bushing peripherally expands to accommodate radially outward movement of said peripheral spring;

wherein said peripheral spring and bushing each contain axial openings for receiving an elongated fastening member to secure the turbine engine component and another turbine engine component made of a dissimilar material together.

2. The fastening system of claim 1, wherein said bushing is a split bushing.

3. The fastening system of claim 1, further comprising at least one axial spring, said axial spring being positioned substantially adjacent to one of said axial openings of said bushing.

4. The fastening system of claim 1, wherein said ribs are joined at at least one end by a continuous and unbroken hoop.

5. A fastening system providing multi-directional compliance comprising:
   a ceramic turbine engine component operatively connected to a turbine engine and having an opening;
   a clevis having a set of opposing openings, wherein said opening in said ceramic turbine engine component is positioned between and in alignment with said set of opposing openings in said clevis, wherein said aligned openings receive at least a portion of a fastener assembly;
   said fastener assembly including a bolt, a nut, spring washers, a split bushing and a spring bushing;
   wherein said spring bushing is at least partially enclosed within said split bushing, wherein the spring bushing includes a series of longitudinally bowed ribs, wherein said split bushing and spring bushing are at least partially disposed within said opening in said ceramic turbine engine component, wherein said spring bushing is spaced from said openings in said clevis;
   wherein said spring washers are positioned between said aligning openings of said clevis and said ceramic turbine engine component; and
   said bolt extending axially through the aligning openings of said clevis and said ceramic turbine engine component, said bolt having opposing ends with a head at one end of said bolt and said nut being secured to the other end of said bolt.

6. The fastener system of claim 5, wherein said split bushing has opposing ends, wherein at least a portion of each of said ends extend outside of said opening in said ceramic turbine engine component such that said spring washers bear against said clevis and said ends of said split bushing.

7. The fastener system of claim 5, wherein said ceramic turbine engine component is a turbine vane flange and said clevis is a part of a turbine vane platform.

8. A fastening system providing multi-directional compliance comprising:
   a first turbine engine component operatively connected to a turbine engine and having at least one opening;
   a second turbine engine component having at least one opening, wherein said openings permit the insertion of an elongated fastener;
   at least one axial spring operatively positioned between said first and said second turbine engine components for providing resilient compliance between said first and said second turbine engine components along an axis; and
   at least one peripheral spring for providing resilient compliance between said first and said second turbine engine components transversely to said axis, wherein said at least one peripheral spring is disposed at least partially within said at least one opening in said second turbine engine component, wherein said at least one peripheral spring includes a series of longitudinally-bowed ribs.

9. The fastening system of claim 8, wherein said first turbine engine component has a first coefficient of thermal expansion and said second turbine engine component has a second coefficient of thermal expansion, said first and second coefficients of thermal expansion being unequal.

10. The fastening system of claim 8,
    wherein said series of ribs of said peripheral spring are bowed radially outward from said axis, said ribs are joined at at least one end by a continuous and unbroken hoop.

11. The fastening system of claim 8, wherein the peripheral spring is free to deform within said at least one opening in said second turbine engine component.

12. The fastening system of claim 8, wherein said axial spring is a spring washer.

13. The fastening system of claim 8, further comprising a peripherally expandable member, said peripherally expandable member at least partially enclosing said peripheral spring, said peripherally expandable member and said peripheral spring being disposed at least partially within said at least one opening in said second turbine engine component.

14. The fastening system of claim 13, wherein said peripherally expandable member is a split bushing.

15. The fastening system of claim 14, wherein said split bushing comprises a sleeve having an axial split along at least a portion of said sleeve.

16. The fastening system of claim 8, further including:
    a peripherally expandable member, said peripherally expandable member at least partially enclosing said peripheral spring, said peripherally expandable member and said peripheral spring being disposed at least partially within said at least one opening in said second turbine engine component, wherein said at least one peripheral spring is spaced from said at least one opening in said first turbine engine component, wherein said peripherally expandable member is a split bushing,
    wherein said split bushing includes separable first half and second half, said first half comprising a generally cylindrical sleeve portion having an outer diameter, said second half comprising a generally cylindrical sleeve portion having an inner diameter, said sleeve portion of the first and second halves being longitudinally split, wherein said inner diameter of said second half is greater than said outer diameter of said first half such that said sleeve portion of said first half is axially received at least partially inside of said sleeve portion of said second half.

17. The fastening system of claim 16, wherein each of said first half and said second half has a circumferential flange at an end, wherein said circumferential flange is disposed outside of said opening in said second turbine engine component such that said axial spring bears against said circumferential flange and said first turbine engine component.

18. The fastening system of claim 8, further comprising an elongated member and a retainer, wherein said elongated member passes through said openings in said first turbine engine component and said second turbine engine component, and wherein said elongated member is closed at one end by said retainer.

19. A fastening system providing multi-directional compliance comprising:
    a first structure having at least one opening;
    a second structure having at least one opening, wherein said openings permit the insertion of an elongated fastener;

at least one axial spring operatively positioned between said first and said second structures for providing resilient compliance between said first and said second structures along an axis; and at least one peripheral spring for providing resilient compliance between said first and said second structures transversely to said axis, wherein said at least one peripheral spring is disposed at least partially within said at least one opening in said second structure, wherein said at least one peripheral spring is spaced from said at least one opening in said first structure, wherein said first structure is made of metal, wherein said axial spring directly contacts said first structure and said peripheral spring, and wherein said second structure is made from one of the group of metals, ceramics and composites.

* * * * *